United States Patent
Rau et al.

(10) Patent No.: US 6,187,867 B1
(45) Date of Patent: Feb. 13, 2001

(54) HYDROGENATED NITRILE RUBBER COMPOSITIONS CONTAINING THERMOPLASTIC POLYOLEFINS

(75) Inventors: Paul Rau, Crestwood, KY (US); Philippe Milazzo, Krefeld (DE)

(73) Assignee: Zeon Chemicals L.P., Louisville, KY (US)

(*) Notice: Under 35 U.S.C. 154(b), the term of this patent shall be extended for 0 days.

(21) Appl. No.: 09/276,792

(22) Filed: Mar. 26, 1999

(51) Int. Cl.$^7$ .............................. C08L 33/02; C08L 33/04; C08L 33/06; C08L 9/00
(52) U.S. Cl. .................. 525/221; 525/227; 525/230; 525/232; 525/233; 525/238; 525/240; 525/222
(58) Field of Search .................................. 525/221, 222, 525/227, 230, 232, 233, 238, 240

(56) References Cited

U.S. PATENT DOCUMENTS 5,589,544 * 12/1996 Horrion .................. 525/176

* cited by examiner

*Primary Examiner*—Nathan M. Nutter
(74) *Attorney, Agent, or Firm*—Armstrong, Westerman, Hattori, McLeland & Naughton

(57) ABSTRACT

A rubber composition comprising:
  at least one hydrogenated nitrile rubber, and
  at least one thermoplastic polyolefin, wherein the weight ratio (hydrogenated nitrile rubber:thermoplastic polyolefin) is in the range from 95:0.5 to 50:50. The composition retains substantially the resistance to heat and chemicals and the mechanical properties characteristic of hydrogenated nitrile rubber upon curing.

13 Claims, No Drawings

HYDROGENATED NITRILE RUBBER COMPOSITIONS CONTAINING THERMOPLASTIC POLYOLEFINS

The present invention relates to hydrogenated nitrile rubber compositions containing thermoplastic olefins, which retain substantially the desirable resistance to heat and chemicals and the mechanical properties characteristic of hydrogenated nitrile rubbers when vulcanized, and further have other improved mechanical properties. The invention also relates to processes for preparing the compositions, and articles made therefrom.

BACKGROUND OF THE INVENTION

Aside from being used in tires, rubber is used in a variety of other parts for automobiles, and other motorized vehicles and machines. In those environments, the components made from rubber have to withstand exposure to different chemical environments, such as oil, water, air or ozone, without losing the mechanical properties required for their intended use over a wide range of operating temperatures.

Hydrogenated nitrile rubbers, which have good heat-aging resistance and resistance to chemicals as well as suitable mechanical properties, are used in mechanical parts for performance in physical environments such as automobiles. However, the use of hydrogenated nitrile rubbers in some applications is limited by their relatively high cost.

Blends with other elastomers such as NBR, ECO, EPDM, CR, CPE, and the like have been considered. For example, U.S. Pat. No. 5,612,418 describes blends of a partially hydrogenated nitrile rubber and a polyacrylate elastomer. In general, some compromise of physical properties, especially heat resistance, must be made in such elastomeric blends. An important requirement for those blends is occuring between the elastomers to maintain key thermoset type properties, e.g., elevated temperature compression set resistance.

Also, in the prior art, attempts to combine the use of thermoplastic resins with rubbers have focused on using the rubbers as modifiers for the thermoplastic resins, in proportions such that the rubbers are dispersed as discrete particles, which may be partially vulcanized, in a matrix of the elastomers. For example, thermoplastic resins thus modified with hydrogenated nitrile rubbers are known. However, those compositions are not suitable for applications for which rubbers are usually used. In other words, such rubber-modified elastomers do not have sufficient rubber-like properties.

SUMMARY OF THE INVENTION

One aspect of the present invention is to provide hydrogenated nitrile rubber compositions containing thermoplastic polyolefins, e.g. polyethylene, which retain the desirable resistance to heat and chemicals and the mechanical properties characteristic of hydrogenated nitrile rubbers, and further have other improved mechanical properties.

Another aspect of the invention is to provide processes for preparing the hydrogenated nitrile rubber compositions containing thermoplastic polyolefins.

Yet another aspect of the invention is to provide articles made from the hydrogenated nitrile rubber compositions containing thermoplastic olefins.

DETAILED DESCRIPTION OF THE INVENTION

Hydrogenated nitrile rubbers are prepared by hydrogenating the conjugated diene units of an unsaturated nitrile-conjugated diene copolymer rubber or an unsaturated nitrile-conjugated diene-ethylenically unsaturated monomer terpolymer by known methods. The unsaturated nitrile-conjugated diene copolymer rubber or the unsaturated nitrile-conjugated diene-ethylenically unsaturated monomer terpolymer is prepared, for example, by emulsion polymerization or solution polymerization.

Examples of the unsaturated nitrile monomer for preparing nitrile rubbers are: acrylonitrile and methacrylonitrile.

Examples of the conjugated diene monomer for preparing nitrile rubbers are: 1,3-butadiene, 2,3-dimethylbutadiene, isoprene and 1,3-pentadiene.

Examples of the ethylenically unsaturated monomers which are copolymerizable with the nitrile monomers and the conjugated diene monomers are: unsaturated carboxylic acids such as acrylic acid, methacrylic acid, itaconic acid and maleic acid and salts thereof, alkyl esters of unsaturated carboxylic acids such as methyl acrylate and butyl acrylate; alkoxyalkyl esters of unsaturated carboxylic acids such as methoxy acrylate, ethoxyethyl acrylate, methoxyethyl acrylate, acrylamide, methacrylamide; N-substituted acrylamides such as N-methylolacrylamide, N,N'-dimethylolacrylamide and N-ethoxymethylolacrylamide; N-substituted methacrylamides such as N-methylolmethacrylamide, N,N'-dimethylolmethacrylamide and N-ethoxymethylmethacrylamide.

In lieu of the copolymerizable ethylenically unsaturated monomer a non-conjugated diene such as vinylnorbornene, dicyclopentadiene or 1,4-hexadiene may be used as a comonomer in the nitrile rubber.

Examples of the hydrogenated nitrile rubber used in the invention are the hydrogenated products of a butadiene-acrylonitrile copolymer rubber ("NBR"), an isoprene-acrylonitrile copolymer rubber, an isoprene-butadiene-acrylonitrile copolymer rubber, and a butadiene-acrylic acid-acrylonitrile copolymer rubber.

A commonly used hydrogenated nitrile rubber is HNBR made of 15 to 50% by weight of acrylonitrile and 85 to 50% by weight of butadiene by the free-radical initiated solution or emulsion copolymerization of these monomers. The unsaturated units derived from butadiene in the obtained NBR rubber are hydrogenated so that the remaining degree of unsaturation is from 0.1 to 20%. Hydrogenated nitrile rubbers having a degree of unsaturation lower than 0.1% are not readily peroxide curable, and those having a degree of unsaturation above 20% are less resistant to heat aging and to attack by ozone.

The hydrogenated nitrile rubber in the composition of the present invention can be a single hydrogenated nitrile rubber or a mixture of two or more hydrogenated nitrile rubbers selected to give the desired balance of properties.

Thermoplastic polyolefins are thermoplastic resins which are not rubbers, i.e., they exhibit some degree of crystallinity, have melting temperatures above room temperature, and are typically not rubbery in their intended range of usage temperature. They are widely used, typically in applications where they are cast, molded or extruded into articles such as containers, various consumer articles, pipes, films, insulating covers material for cables, etc. Thermoplastic polyolefins are versatile because of their low cost, their chemical resistance, their useful range of mechanical properties and the fact that they can be cross-linked, for example with peroxides.

The thermoplastic polyolefins suitable for use in the present invention are polymers of unsaturated aliphatic hydrocarbons containing one double bond per molecule, the most common monomers being ethylene and propylene. Isobutene, but-1-ene and 4-methylpent-1-ene are examples of other suitable monomers. The thermoplastic polyolefins may be homopolymers of the unsaturated aliphatic hydrocarbons, copolymers of an unsaturated aliphatic hydrocarbon with another unsaturated aliphatic hydrocarbon, or copolymers of an unsaturated aliphatic hydrocarbon with another monomer such as vinyl acetate, ethyl acrylate, unsaturated carboxylic acids (e.g., methacrylic acid).

For use in the rubber composition of the invention, the thermoplastic polyolefin is not particularly limited, and may be selected according to the desired properties for a particular application. The polyolefin used in the composition of the present invention can be a single polyolefin or a mixture of two or more polyolefins selected to give the desired balance of properties, in particular mechanical properties. Curing is required to achieve the desirable properties characteristics of the present invention, and peroxide curing agents are particularly suitable because they serve as crosslinking agents for most polyolefins, in particular polyethylenes, as well as for the hydrogenated nitrile rubber. In other words, in the rubber composition of the invention the thermoplastic polyolefin is at least partially cross-linked after curing of the composition.

Further description of polyolefin polymers is provided in the Encyclopedia of Chemical Technology, $3^{rd}$ ed., Vol. 16, pages 385–479 (1981), the content of which is incorporated herein by reference.

Among thermoplastic polyolefins, polyethylenes and polypropylenes are the most widely used and are available in a broad range of properties. In particular, polyethylenes are the subject of ASTM classification by type depending on their densities. In addition to the ASTM classification, the following additional terms are used for describing polyethylenes:

LDPE: low density polyethylene having a high degree of branching, produced by high pressure polymerization which was the originally developed method of production for polyethylenes;

HDPE: high density polyethylene, linear with little branching, produced by low pressure polymerization which is a more recently developed method of productions; and LLDPE: linear low density polyethylene, also produced by low pressure polymerization.

The properties of polyethylenes, in particular the degree branching and the physical performance characteristics, may be altered by copolymerizing ethylene with an α-olefin comonomer or by grafting of other functional monomers such as maleic anhydride and the like. Thus, the term LLDPE may refer to a copolymer of ethylene with an α-olefin such as 1-butene, 1-pentene, or 1-octene. LLDPEs have a superior balance of toughness, stiffness, stress-crack resistance and electrical properties, compared to LDPEs, whereas HDPEs are very versatile thermoplastics characterized by high resistance against solvents and chemicals at ambient temperatures and safe for unrestricted usage in contact with food. Therefore, LLDPEs and HDPEs are more commonly used nowadays than LDPEs.

In the present invention the hydrogenated nitrile rubber is blended with the thermoplastic polyolefin in a weight ratio (hydrogenated nitrile rubber:polyolefin) in the range from 95:0.5 to 50:50, preferably from 85:15 to 65:45; and more preferably from 80:20 to 70:30. The composition may also contain small amounts of other elastomers or rubbers, provided that the properties of the hydrogenated nitrile rubber/thermoplastic polyolefins are not substantially altered by the presence of such other elastomers or rubbers.

The composition of the present invention may contain additives such as those used in rubber compounding, or additives which may be used with thermoplastisc polyolefins such as UV-protectors. Non-limiting examples of additives are: carbon blacks or other reinforcing fillers; antioxidants, softeners, extenders, plasticizers, antioxidant, antiozonants, etc.

The composition of the present invention also contains vulcanization or curing agents, and optionally vulcanization or curing aids such as activators. The vulcanization/curing agents are not particularly limited. Although peroxide curing agents are preferred in most instances, sulfur-based vulcanization/curing agents are also suitable. There is no particular limitation on the vulcanization/curing aids which may be used optionally with the vulcanization/curing agents.

The composition of the invention is prepared by mixing the hydrogenated nitrile rubber with the thermoplastic polyolefin and the remaining components such as vulcanization/curing agents and any additives, using mixing equipment suitable for processing rubbers, such as Brabender mixers, roll mills, Banbury mixers, mixing extruders, etc., at a temperature sufficiently high so that the polyolefin is melted.

The morphology of the composition of the invention depends on the relative amounts and the respective properties of the hydrogenated nitrile rubber and thermoplastic polyolefin. In the more common morphology the thermoplastic polyolefin is dispersed in the hydrogenated nitrile rubber. However, the two phases of the hydrogenated nitrile rubber and the thermoplastic polyolefin may also be co-continuous.

The composition of the invention may be cured by conventional methods, for example, by heating at 140° C.–220° C. for up to 30 minutes, usually from 4 to 10 minutes. The composition may be formed into articles, such as automobile belts and in particular timing belts, by conventional processes such as compression molding, transfer molding or injection molding followed by curing.

The following examples further illustrate aspects of the invention but do not limit the invention. Unless otherwise indicated, all parts, percentages, ratios, etc., in the examples and the rest of the specification are in terms of weight.

EXAMPLES

The blends shown in Table 1 were mixed in a laboratory 1.6 liter internal, tangential rotor Banbury mixer up to 145° C. for 3 to 5 minutes per batch. The specific mixing procedure is listed below. The finished batches were then further mixed for 1 minute on a laboratory 8"×16" two roll mill and sheeted off to a thickness of between 0.70" to 0.90". Standard ASTM 6"×6"0.070" test samples were cured at 180° C. for between 9 and 10 minutes.

Mixing Procedure

RPM=70, Cooling water at 35° C.

0 minutes—Add all ingredients, then add Zetpol and polyethylene, lower ram and mix.

100° C.—Lift ram, add remaining ingredients, lower ram and mix.

120° C.—Lift ram, sweep, lower ram and mix.

145° C.—Drop batch to room temperature roll mill.

TABLE 1

| Example | 1 Control | 2 LLDPE | 3 LLDPE | 4 LLDPE | 5 HDPE | 6 HDPE | 7 HDPE |
|---|---|---|---|---|---|---|---|
| HNBR[1] | 100.00 | 90.00 | 80.00 | 70.00 | 90.00 | 80.00 | 70.00 |
| LLDPE[2] | -0- | 10.00 | 20.00 | 30.00 | -0- | -0- | -0- |
| HDPE[3] | -0- | -0- | -0- | -0- | 10.00 | 20.00 | 30.00 |
| Carbon black[4] | 50.00 | 50.00 | 50.00 | 50.00 | 50.00 | 50.00 | 50.00 |
| Plasticizer[5] | 5.00 | 5.00 | 5.00 | 5.00 | 5.00 | 5.00 | 5.00 |
| Activator[6] | 5.00 | 5.00 | 5.00 | 5.00 | 5.00 | 5.00 | 5.00 |
| Antioxidant[7] | 1.50 | 1.50 | 1.50 | 1.50 | 1.50 | 1.50 | 1.50 |
| Antioxidant[8] | 1.00 | 1.00 | 1.00 | 1.00 | 1.00 | 1.00 | 1.00 |
| Co-agent[9] | 4.00 | 4.00 | 4.00 | 4.00 | 4.00 | 4.00 | 4.00 |
| Peroxide[10] | 8.00 | 8.00 | 8.00 | 8.00 | 8.00 | 8.00 | 8.00 |
| TOTAL | 174.50 | 174.50 | 174.50 | 174.50 | 174.50 | 174.50 | 174.50 |

[1] ZETPOL 2010 ™ (Zeon Chemicals L.P)
[2] PE PNDA 8320 ™ (Union Carbide)
[3] PE DMDA 8920 ™ (Union Carbide)
[4] STERLING NS ™ N774 Black ™ (Cabot Corporation)
[5] PLASTHALL TOTM ™ (C. P. Hall Co.)
[6] KADOX ™ (Zinc Corp. of America)
[7] NAUGARD 445 ™ (Uniroyal Chemical Co., Inc.)
[8] VANOX ™ (R. T. Vanderbilt Co., Inc.)
[9] SARET ™ (Sartomer Co. Inc.)
[10] VUL-CUP 40KE ™ (Hercules Inc.)

The processing properties, vulcanized properties and aging properties of the samples were measured by the following methods. The results are shown in Table 2.

Mooney viscosity: ML (1+4)@100° C. ASTM D 1646
Mooney scorch: ML (1+30)@125° C. ASTM D 1646
ODR: 3.0° arc at 180° C. ASTM D 2084
MDR: 0.5° arc at 180° C. ASTM D 5289
Hardness A: ASTM D 2240
Stress 100%: ASTM D 412
Tensile strength: ASTM D 412
Elongation: ASTM D 412
Tear Strength: ASTM D 624
Compression set: 70 h/150° C., plied disc Method B per ASTM D 395
Aging in air oven: 70 h/150° C. per ASTM D 573
Aging in hot distilled water: 70 h/100° C. per ASTM D 471
Low temperature brittle point: ASTM D 2137
Gehman low temperature torsional test: ASTM D 1053
Low temperature retraction: 50% elongation ASTM D 1329

TABLE 2

| SAMPLE NO. | 1 | 2 | 3 | 4 | 5 | 6 | 7 |
|---|---|---|---|---|---|---|---|
| Mooney viscosity Mooney Units (MU) | 84.4 | 82.8 | 84.4 | 90.8 | 99.6 | 117.2 | 143.2 |
| Mooney scorch-viscosity (min) | 48.8 | 34.0 | 18.2 | 13.2 | 52.6 | 57.8 | 61.6 |
| ODR | | | | | | | |
| ML (Dn.m) | 14.2 | 12.4 | 10.3 | 8.0 | 12.7 | 10.3 | 8.2 |
| MH (Dn.m) | 06.5 | 92.3 | 91.2 | 90.3 | 96.1 | 93.8 | 91.7 |
| MDR | | | | | | | |
| ML (dN.m) | 0.9 | 0.8 | 0.8 | 0.7 | 0.9 | 0.8 | 0.7 |
| MH (dN.m) | 16.6 | 16.8 | 17.1 | 17.2 | 17.6 | 17.2 | 17.0 |
| Hardness (pts) | 71 | 76 | 82 | 86 | 78 | 83 | 88 |
| Stress 100% (psi) | 756 | 930 | 1135 | 1382 | 1093 | 1351 | 1564 |
| Tensile strength (psi) | 3883 | 3793 | 3932 | 3636 | 4038 | 3890 | 3757 |
| Elongation (%) | 292 | 291 | 317 | 295 | 312 | 294 | 281 |
| Tear strength (ppi) | 270 | 307 | 296 | 328 | 288 | 288 | 359 |
| Compression set (% set) | 25.4 | 20.4 | 20.2 | 20.0 | 20.4 | 20.2 | 21.9 |
| Aging in air oven | | | | | | | |
| Hardness (pts) | 76 | 80 | 83 | 89 | 82 | 85 | 90 |
| Hardness change (pts) | 5 | 4 | 1 | 3 | 4 | 2 | 2 |
| Aging in hot water | | | | | | | |
| Volume change (%) | 0.16 | 0.17 | 0.34 | −0.17 | 0.26 | −0.44 | −0.18 |
| Low temp. brittle point (° C.) | −70 | −68 | −68 | −68 | −68 | −64 | −62 |
| Gehman low temp. torsional test (° C.) | | | | | | | |
| T2 | −18 | −16 | −15 | −11 | −18 | −15 | −10 |
| T5 | −23 | −23 | −23 | −23 | −24 | −24 | −23 |
| T10 | −26 | −26 | −26 | −27 | −27 | −27 | −23 |
| T100 | −30 | −31 | −33 | −34 | −31 | −33 | −33 |
| Low temp. retraction, 50% elongation (° C.) | | | | | | | |
| | −23 | −22 | −23 | −23 | −23 | −22 | −23 |
| | −19 | −17 | −16 | −16 | −18 | −16 | −13 |
| | −16 | −13 | −12 | −10 | −14 | −11 | −7 |
| | −12 | −9 | −7 | −5 | −10 | −7 | −2 |

As seen from Table 2, the tested samples according to the invention, which contained polyethylene blended with hydrogenated nitrile rubber, exhibited an increase in tear strength and a slight decrease in compression set, which decrease is rather surprising and also very desirable. Most importantly, the samples which contained polyethylene blended with hydrogenated nitrile rubber according to the invention are not different in properties in any undesirable manner from the sample of unblended hydrogenated nitrile rubber. Therefore, the composition of the invention can advantageously be used in lieu of unblended hydrogenated nitrile rubber, making possible a reduction in cost without sacrificing performance.

Other embodiments of the present invention will be apparent to those skilled in the art from consideration of the specification and practice of the invention disclosed herein. It is intended that the specification and examples be considered as illustrative only, with the true scope and spirit of the invention being indicated by the following claims.

What is claimed is:

1. A rubber composition comprising:
   at least one hydrogenated nitrile rubber,
   at least one thermoplastic polyolefin, and
   a curing system which causes the thermoplastic polyolefin to be at least partially cross-linked upon curing of the hydrogenated nitrile rubber,
   wherein the weight ratio (hydrogenated nitrile rubber::thermoplastic olefin) is in the range from 95:0.5 to 50:50.

2. A rubber composition according to claim 1, wherein the weight ratio (hydrogenated nitrile rubber:thermoplastic polyolefin) is in the range from 85:15 to 65:45.

3. A rubber composition according to claim 1, wherein the weight ratio (hydrogenated nitrile rubber:thermoplastic polyolefin) is in the range from 80:20 to 70:30.

4. A rubber composition according to claim 1, wherein the hydrogenated nitrile rubber is HNBR.

5. A rubber composition according to claim 1, wherein the thermoplastic polyolefin is LLDPE.

6. A rubber composition according to claim 1, wherein the thermoplastic polyolefin is HDPE.

7. A vulcanized rubber composition obtained by vulcanizing a rubber composition comprising:
   at least one hydrogenated nitrile rubber,
   at least one termoplastic polyolefin, and
   a curing system which causes the thermoplastic polyolefin to be at least partially cross-linked upon curing of the hydrogenated nitrile rubber,
   wherein the weight ratio (hydrogenated nitrile rubber::thermoplastic polyoefin) is in the range from 95:0.5 to 50:50.

8. A vulcanized rubber composition according to claim 7, wherein the weight ratio (hydrogenated nitrile rubber:thermoplastic polyolefin) is in the range from 80:20 to 70:30.

9. A vulcanized rubber composition according to claim 7, wherein the hydrogenated nitrile rubber is HNBR.

10. A vulcanized rubber composition according to claim 7, wherein the thermoplastic polyolefin is LLDPE.

11. A vulcanized rubber composition according to claim 7, wherein the thermoplastic polyolefin is HDPE.

12. An article made of a rubber composition comprising:
    at least one hydrogenated nitrile rubber,
    at least one thermoplastic polyolefin, and
    a curing system which causes the thermoplastic polyolefin to be at least partially cross-linked upon curing of the hydrogenated nitrile rubber,
    wherein the weight ratio (hydrogenated nitrile rubber::thermoplastic polyolefin) is in the range from 95:0.5 to 50:50.

13. An article according to claim 12, which is a belt for an automobile.

* * * * *